Patented Feb. 23, 1954

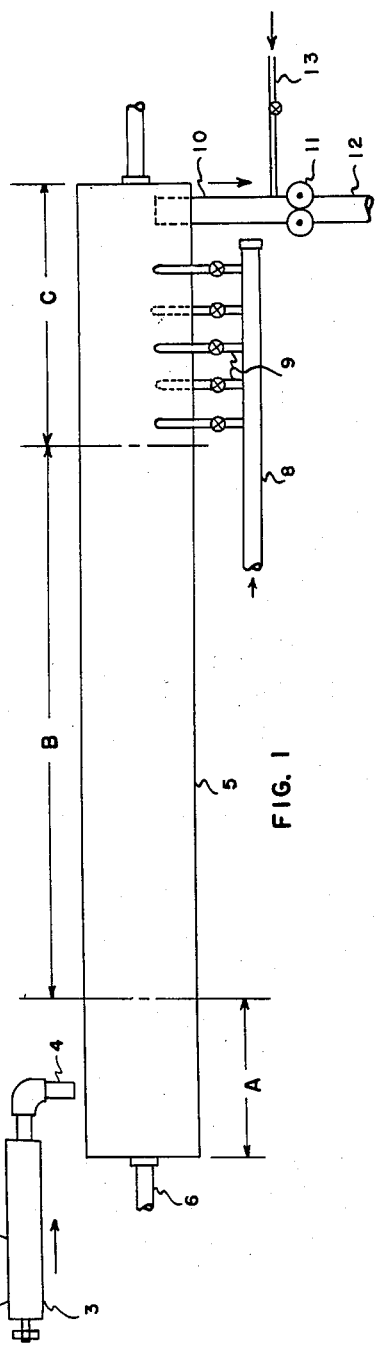
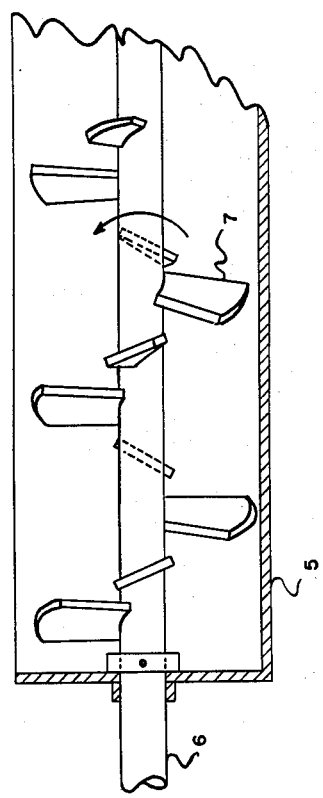
R.P. GRAHAM, G.H. NEEL,
N. FISHMAN.
INVENTORS.

2,670,289

UNITED STATES PATENT OFFICE 2,670,289

CONDITIONING OF LIMED PEAR WASTE

Robert P. Graham, El Cerrito, George H. Neel, Albany, and Norman Fishman, Oakland, Calif., assignors to the United States of America as represented by the Secretary of Agriculture Application June 15, 1951, Serial No. 231,886

3 Claims. (Cl. 99—2)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the utilization of pear waste. In particular, it relates to methods for treating raw pear waste whereby this material can be separated into useful fractions. Thus the invention contemplates separating the waste into a solid fraction and a juice fraction. The solid fraction contains minerals and carbohydrates and can be dried and used as an animal feed. The juice fraction is a clear, straw yellow to amber solution containing sugars in such amounts that it can be used for many purposes. For example, the juice fraction can be used as a nutrient medium for the culture of yeast or other microorganisms. Further, it can be concentrated by evaporation to produce a molasses which can be used in animal feeds, human foods, or which can be utilized for preparing microbiological culture media. The molasses produced in this manner has a higher ratio of sugar to total solids than does beet or cane molasses and hence is a valuable carbohydrate source.

Thus an object of this invention is to provide methods whereby useful products can be recovered from pear waste. Another object is to provide methods whereby the pear waste can be treated to alter its chemical and physical nature so that it can efficiently be separated into its solid and juice fractions as by filtration or pressing. Another object is to provide methods for preparing a clear, sugar-containing juice from the waste, said juice being free from undesirable pectinous or other colloidal substances whereby it may be concentrated to a molasses without solidifying or gelling. A further object is to provide methods whereby to recover from the waste a solid fraction which can be dried readily and efficiently to produce a material useful as a stock feed or for other purposes.

A specific object of this invention is to provide methods for conditioning limed pear waste by subjecting it to a cutting action whereby to alter the properties of the waste so that its rate of filtration is markedly increased.

Pear waste is a material produced in enormous tonnages at pear canning plants and usually consists of pear peels, seeds, cores, trimmings, overripe and cull fruit. In pear canning operations, the amount of waste is from 40% to 45% of the total weight of pears. The disposal of this waste constitutes a serious problem. This problem is especially acute in areas where local and state authorities forbid dumping the waste directly into streams and where facilities for sewage disposal are not adequate to handle the waste. In such cases the waste must be hauled from the factory to a dumping ground, at considerable cost to the processor. By applying the principles of this invention, this waste can be converted into valuable materials. Utilization of the waste would furthermore reduce health hazards resulting from dumping of the waste.

Many attempts have been made in the past to utilize pear waste, particularly to separate it into its solid and juice fractions. Such attempts have all been unsuccessful. The difficulty is that pear waste is a slimy mass containing finely divided cellular material. When filtration or pressing is attempted to separate the juice from the solids, the finely-divided cellular material clogs the pores of the filter or press cloth so that little or no passage of liquid can take place. If any juice is obtained, it still contains so much suspended matter that if it is evaporated sufficiently to be self-preserving, it will solidify in the evaporator. Further, the filter or press cake obtained thereby still contains so much water that if it is introduced into a dryer such as a rotary kiln dryer, it forms a taffy-like mass which sticks to the walls of the dryer or forms lumps or balls which do not dry properly. If the pear waste is finely ground and subjected to filtration or pressing, much of the waste will pass through the filter or press cloth and little separation will be achieved.

Various methods have been advocated for separating the juice and solid fractions of fruit pulps. These processes involve a lime treatment or a treatment using both lime and phosphoric acid (or other polybasic acid). These methods are based on the addition of an excess of lime to the waste to cause formation of calcium salts with the organic acids in the fruit material. The formed calcium salts then precipitate occluding with them various other solid materials such as fruit pulp, fiber and so forth. In many cases, particularly where the fruit pulp is deficient in organic acids, phosphoric acid or other polybasic mineral acid is also added. The resulting precipitate of calcium phosphate then assists in the separation as it occludes solid material as it comes out of solution. With some fruit wastes these methods have proved satisfactory. However in the case of pear waste, the known methods do not give successful results—the separation is inefficient because the material still tends to blind the filter or press cloths and the juice obtained is contaminated with pectinous materials which cause difficulties when the juice is evaporated.

In the patent application of R. P. Graham, J. H. Thompson, and A. D. Shepherd, Serial No. 214,192, filed March 6, 1951, now Patent No. 2,614,933 granted October 21, 1952, there is disclosed a method for treating pear waste which gives effective separation of the waste into its solid and juice components. The procedure involves, essentially, mixing sufficient lime with the pear waste to establish a pH of about from 6 to 9, preferably 8.5. This mixture is then agitated slowly while the mass gels. Syneresis (separation of juice from the gelled mass) is then promoted by heating the mass. Finally an additional amount of lime is added and the mixture filtered or pressed to separate the juice from the solid portion.

We have now found that the above procedure is greatly improved if the limed pear waste is subjected to a cutting action at least from the time the mass begins to gel, until the syneresis is well under way. By applying such a treatment we have found that the mass exhibits a marked increase in filtrability. We have observed that such a cutting action has a result entirely different from that obtained with agitation. Thus agitation, as with conventional paddles and propellers, tends to crush and smear the gel particles whereby finely-divided solids are forcibly removed from the gelled particles and intermixed into the mass. The effect of these fine solids is extremely deleterious since they blind the pores of the filter or press cloth and thus reduce the rate of filtration or pressing. When, however, the limed mass is subjected to a cutting action, the gel particles are divided into smaller sections whereby their surface area is greatly increased thus to promote the desired exudation of juice from the gel structure. Since the division is done by a cutting action there is little disruption of the structure of the gel and hence finely-divided materials enmeshed in the gel structure are not dislodged. The cutting action thus has the effect of promoting syneresis whereby the gelled particles are made smaller and the exudation of clear juice from the gelled particles is promoted. Each piece of gelled waste may be regarded as a sponge of fine porous texture which has entrapped in its pores clear juice and finely-divided solids. When such a sponge is crushed or torn apart, the stresses of such crushing or tearing will eject the juice so forcibly that it will carry with it these finely divided solids. If however, the sponge is divided by cutting, then new pores will be exposed and juice will exude therefrom while the finely-divided solids will remain enmeshed in the interstices of the sponge which in itself acts as a filter under such conditions and retains these fines.

In applying our novel process in practice, the following sequence of operations is carried out:

The raw pear waste is first ground or otherwise comminuted to permit thorough contact with the added reagents. The disintegration may be accomplished in any of the usual devices such as a hammer mill or brush mill.

After being comminuted, the waste is mixed with lime to activate the pectin de-esterifying enzymes and to promote formation of a gel with the resulting de-esterified products. Sufficient lime should be added to establish a pH from about 6 to about 9, this range providing the proper environment for the enzymic reaction. In general, the enzymic reaction is fastest at the upper end of this pH range. Usually we prefer to employ a pH of about 8.5 which gives rapid enzymic reaction and yet minimizes danger of localized overliming during mixing and also maintains the pH above 6 as the lime is consumed in the reaction. The lime may be added to the pear waste in powder form and thoroughly mixed therewith. Usually, however, we prefer to apply the lime in the form of an aqueous slurry in which condition the lime can be readily measured out and rapidly incorporated in the waste. Although lime is the preferred calcium source from an efficiency and economy standpoint, one can use other compounds or mixtures equivalent thereto such as a mixture of a calcium salt like calcium chloride plus sufficient alkali such as sodium hydroxide to cause establishment of the proper alkaline pH in the waste. In any case the lime or other calcium source should be thoroughly incorporated in the waste by agitation of the mixture.

The mixture of pear waste and lime is then subjected to the cutting action. Application of the cutting action may be delayed until gelling has initiated since it is not essential prior to this point. In general, gelling starts about 2–5 minutes after addition of the lime. The cutting action may be applied in various ways. We have found that for large scale operation, it is preferred to feed the limed waste into a trough where it is subjected to the action of a device consisting of rotating shaft bearing blades which are arranged in a spiral about the shaft, each blade being turned at a slight angle from a plane normal to the axis of the shaft. This shaft is rotated at a slow speed to avoid turbulence or agitation and as each blade enters the mass it exerts a cutting and intermittent conveying action with no crushing or smearing of the particles and with little agitation of the mass. As explained above this division of the gelled pieces increases their surface area and promotes exudation of clear juice from the particles thus increasing the filterability of the mass. This continuous cutting action is applied to the mass during the time that gelling is going to completion and until syneresis is well under way. The fact that the syneresis is taking place can easily be determined by observation of the mass. As syneresis takes place it will be seen that pools of clear juice separate out from the mixture. During the period when the cutting action is applied, the mixture is generally held at room temperature mostly for convenience. If desired the mixture may be heated. It is to be noted however that since the reactions involved are largely enzymic in nature, the temperature cannot be varied over too great a range. In general, the temperature should be maintained in the range from about 60° F. to about 120° F., the reaction being accelerated at the higher temperatures within this range.

After syneresis is established, the mass is then heated to favor further exudation of clear juice from the gelled particles. This heating can be accomplished most readily by simply introducing steam into the batch; the dilution of the mixture with condensed steam does not have any harmful effect. Usually it is preferable to continue the cutting action during this heat treatment although at this point the material has completely changed in character and conventional agitation may be used. By continuing the cutting and intermittent conveying action, as heretofore described, the slowly rotating blades cut through the mass and subject it to a gentle working action which has the effect of promoting syneresis resulting in a further elimination of clear juice from the gelled pieces thus significantly increasing the filterability of the mass. Instead of using direct contact with steam, the treating vessel may be equipped with steam coils or other heating means. In any case the mass should be brought up to a temperature from about 150° F. to about 180° F. It has been found that temperatures at the lower end of this range are particularly suited where the waste is derived from ripe fruit, while temperatures at the upper end of the range are more suited to cases where the waste is derived from green fruit.

The heated mass is now capable of treatment by two alternative procedures. (1) The mass may be directly subjected to a pressing or filtration operation to separate the juice from the solids or (2) the mass may be first treated with an additional increment of lime to still further increase the filterability of the mass. Usually, we prefer the latter course although in many cases depending on the properties of the particular lot of pear waste the application of the cutting action so completely modifies the mass that the second lime addition can be omitted.

If additional lime is used the amount of the additional increment will vary depending on several factors such as the type of pear waste, the pH used in the enzymic process, the amount of pectinous material in the waste, and so forth. The optimum amount of lime to be used in any particular instance can be determined by withdrawing samples from the batch, adding a different quantity of lime to each sample, and noting the filtration properties of each. From the resulting information one would then treat the entire batch with the concentration of lime which was found to give the most efficient separation, i. e., maximum porosity of filter cake or press cake and rate of filtration or pressing. In most cases, the proper amount of lime to be added will be in the range from about 1 to about 4 times the amount of lime added in the initial lime treatment. After mixing the requisite amount of lime with the hot waste, the mass is then, preferably while still hot, subjected to the pressing or filtering treatment to separate the juice from the solid components.

Whether or not additional lime is added, it is not essential to filter or press the hot mass immediately; it may be stored at the elevated temperature (about 150°–180° F.) for several hours without undergoing deterioration. In some cases such storage for about ½ to 2 hours further improves the filterability of the treated waste.

In carrying out the separation of juice from solids, whether or not additional lime is added, one may use a rack and cloth press, a bag press or other conventional pressing device. We prefer however to conduct the separation with the device described in the patent application of Robert P. Graham, John H. Thompson, and Amon H. Brown, entitled Apparatus and Process for Dejuicing Fruit Pulps, Serial No. 209,672, filed February 6, 1951. This device comprises two rotating filter drums and a vessel positioned on top of the drums. The treated waste is pumped into the vessel whereby filter cakes are formed on the drum surfaces. As the drums rotate, the separate filter cakes are merged and squeezed between the drums. This device thus accomplishes a preliminary filtering or thickening of the waste followed by a pressing action and achieves a very efficient separation of the treated waste into a high solids content cake and a clear juice.

The chemical and physical changes on which our invention is based can be explained as follows: The initial liming operation involves an enzymatic reaction. Thus the pear waste naturally contains pectin and pectin de-esterifying enzymes. By addition of lime to increase the pH of the waste and by suitable control of temperature, the environmental conditions are made conducive to enzymic action. Under these conditions, the enzymes are activated and the pectin is thereby converted into low-methoxyl pectinic acids and/or pectic acid. In the initial or mixing stage the mass remains fluid having the consistency of a typical fruit puree. However, as a substantial proportion of the pectin is de-esterified the mixture rapidly stiffens and becomes a gel, that is, the de-esterified products combine with the calcium ions in the waste to form a gel which occludes the solid components of the waste, including the finely-divided material plus most of the juice. This gel stage is generally initiated about 2–5 minutes after addition of lime and the mass rapidly becomes stiffer in texture as additional pectin is de-esterified or as the initially formed de-esterification products undergo further enzymatic de-esterification. Beginning with initiation of gelling, the mass is subjected to a cutting action as with slowly rotating blades. Thereby the gel is continually cut into pieces it being observed that these pieces do not adhere but remain separate. As the cutting progresses past the point of maximum gel strength it will be observed that the gel synerizes; that is, pools of liquid are formed by exudation of clear juice from the divided chunks of gelled waste. Eventually it is noticed that the mass is essentially a two-phase system—one phase being clear juice, the other particles of gelled pectinous material containing occluded finely-divided solid material plus some juice. This synerized mass is then heated, this operation having several significant results. In the first place the heating promotes syneresis of the gel, that is, the gel particles lose most of their juice content so that one then has a mass of gelled particles suspended in clear juice, the gelled particles containing a lesser proportion of juice than prior to the heating. The heating also inactivates the enzyme systems so that further enzymic action is prevented. Further, the heating destroys a large part of the microbial population of the waste so that the final products will keep better. In the second liming operation, the gel particles are altered so that they take on the character of being true granular precipitates rather than insoluble gels. Thus during the first stage liming operation (the enzymatic process) the amount of calcium is necessarily limited to that required to obtain the proper conditions for the enzymatic changes to occur. When the pectinic acids and pectic acid are formed, sufficient calcium is present for these materials to gel. However, these compounds still possess free carboxyl groups because of the limited quantity of calcium which is present. By addition of more calcium ions in the second stage liming operation, more of the free carboxyl groups are salified with calcium ions whereupon the pectinic and pectic compounds become more insoluble and lose their gel-like character and are transformed into true precipitates. In effect, the gels are dehydrated. In this form the pectinates and pectates still occlude the finely-divided suspended material but hold less juice thus by the transformation, most of the fraction of juice formerly entrapped in the gel formations is released into the general juice phase in which the calcium pectinate or pectate precipitates containing occluded finely-divided material are suspended. At this point then the waste consists of a clear juice phase and particles of pectinous material occluding the finely-divided components of the waste. In this case the particles of pectinous material contain a very low proportion of juice, practically all the juice being in the clear juice phase. Under these conditions the waste becomes much easier to separate and exhibits an increased rate of filtration and an increased porosity of filter case.

In the annexed drawing is illustrated apparatus which we have found to be useful for carrying out the process of this invention.

Fig. 1 represents a side view of the conditioning apparatus.

Fig. 2 represents a view on an enlarged scale of the left end of the conditioning unit depicted in Fig. 1. The side of the unit has been broken away to show the inside thereof and the construction of the cutting blades.

Referring now particularly to the drawing, the apparatus and its functions are described as follows: Ground pear waste and an aqueous slurry of lime are fed at controlled rates through pipes 1 and 2, respectively, into mixer 3. The rate of flow of the waste and lime slurry are so proportioned that the mixture of the two has a pH from about 6 to 9, preferably about 8.5. Mixer 3 is a conventional high-speed mixer which retains the limed pear waste for only a short period of time, i. e., one minute or less. The limed waste flows through pipe 4 into open-top, U-shaped trough 5, the mixture at this point being essentially a fluid containing suspended material and of the consistency of a typical whole fruit puree. Trough 5 is provided with a horizontally extending shaft 6 on which are positioned a series of blades 7. These blades are positioned on the shaft in a spiral pattern, each blade being about 85° apart along the shaft. On rotation of the shaft at a slow speed on the order of 1 or 2 R. P. M. by suitable means such as an electric motor with speed control device (not illustrated), these blades continually cut into the mass of limed waste and at the same time nudge the contacted mass to the right. During a typical run, trough 5 is filled with the limed waste about up to the level of the shaft. Each blade is so positioned that its leading edge contacts the mass about at right angles to the level of the mass and so exerts a distinct cutting action with a minimum of agitation, crushing or smearing. In typical runs, it has been noted that in the first section of the trough designated by A and involving a residence of 1 or 2 minutes the limed waste is still fluid although toward the right end of this section the mass is definitely getting stiffer. In the section designated as B, the mass undergoes first gelling and then syneresis. Thus at the left end of section B it is noted that the mass is assuming the consistency of a gel and as the blades cut through it leaves lines of separation which do not heal. As the blades continue to cut the gelled mass it is converted into smaller particles of gelled material with considerable exudation of clear juice from the particles thus at the right end of section B, the material in the trough is largely clear juice plus small gel particles (largest dimension $\frac{1}{32}''$ to $\frac{1}{8}''$) containing enmeshed finely-divided material. The mixture at this point has such physical characteristics that a large proportion of the clear juice can be separated by decanting or screening.

The synerized mass is conveyed further along the trough into section C where it is further subjected to the cutting action and heated to a temperature from about 150° F. to about 180° F. Steam is supplied from manifold 8 to pipes 9 which communicate directly with the interior of trough 5. In passing through section C, further syneresis takes place and the enzymes are inactivated and the bacterial content of the waste is largely destroyed. The heated, conditioned waste flows through standpipe 10 to gear pump 11 which pumps the material via pipe 12 to a suitable filter or press to separate the juice and solid components. A valved pipe 13 is provided for addition of a second quantity of lime slurry if this alternative procedure is used.

The following examples demonstrate our invention in greater detail. It is understood that these examples are furnished only by way of illustration and not limitation.

EXAMPLE I

A. *Process in accordance with this invention*

Raw pear waste with a solids content of 15%, hammermilled through a $\frac{3}{16}''$ screen, was fed at a constant rate of 50 gallons per hour into a small high-speed mixer where it was mixed with 0.43 gallon per hour of a 20% aqueous lime slurry to give a pH of 8.5 (3.5 cc. lime slurry per 400 grams waste). The limed waste, after residing in the mixer for about a minute, was continuously fed into a blade-type trough conveyor (as above described) the trough being 11 inches in diameter and 10 feet long, the blade shaft being rotated at 1.5 revolutions per minute. A 15-minute retention time was obtained in the first 7 feet of the trough, thus in this portion of the device the reaction was conducted essentially at room temperature (about 75° F.). Live steam was injected into the remaining 3 feet of length to raise the temperature of the mass to 170° F. The mass having been subjected to the cutting action of the revolving blades as above described was continuously withdrawn from the end of the trough. Samples of this product were mixed with various increments of lime and tested to determine their filtration characteristics. In all cases, the filtrations were determined on a constant area filter of the suction type using a constant vacuum of 10 inches of mercury in the filtrate chamber. The amount of filtrate collected at various time intervals during the filtration was ascertained, thus to determine the filtrability of the sample. Obviously the larger the amount of liquid collected, the greater is the filtrability of the sample. The results obtained are set forth in Table 1.

B. *Control—Procedure using conventional agitation*

A sample of the same raw pear waste as used in part A was mixed as a batch in a pot with the same proportion of lime slurry to give a pH of 8.5. The limed waste was stirred for 15 minutes with a spoon to obtain agitation equivalent to that obtained with a paddle-type slow-speed agitator on a large scale. The mixture was then heated with steam to 170° F. and additional increments of lime added to samples of the mixture. These samples were then subjected to the same filtration tests as in part A. The results obtained are set forth in Table 2.

TABLE 1.—FILTRATION RATE OF SAMPLES PRODUCED IN ACCORDANCE WITH THIS INVENTION

| Sample | Additional lime added, cc. of 20% slurry per 400 grams sample | Volume of juice separated, cc. | |
|---|---|---|---|
| | | at 30 sec. | at 50 sec. |
| A1 | 2 | 144 | 188 |
| A2 | 4 | 165 | 215 |
| A3 | 6 | 155 | 210 |

TABLE 2.—FILTRATION RATES OF CONTROL SAMPLES

| Sample | Additional lime added, cc. of 20% slurry per 400 grams sample | Volume of juice separated, cc. | |
|---|---|---|---|
| | | at 30 sec. | at 50 sec. |
| B1 | 2 | 36 | 106 |
| B2 | 4 | 116 | 141 |
| B3 | 6 | 125 | 157 |

It is evident from the above tables that the products of this invention gave filtration rates much higher than the products handled in the conventional manner.

EXAMPLE II

Raw pear waste with a solids content of 14.2% was hammermilled through a 3/16" screen and mixed with lime to give a pH of 8.5. The limed waste was then conditioned in the same manner and same equipment as set forth in Example I, part A. A control sample was also run in the same manner as in Example I, part B. In these tests no additional lime was added to either sample but the conditioned waste after heating to 170° F. was filtered directly. Filtration rates were conducted on the products as described in Example I. The following results were obtained:

TABLE 3

| Sample | Volume of juice separated, cc. | | |
|---|---|---|---|
| | at 30 sec. | at 60 sec. | at 90 sec. |
| In accordance with this invention | 93 | 128 | 151 |
| Control | 48 | 64 | 76 |

It is evident from these data that where no additional lime is added, the product in accordance with this invention gives filtration rates about double those obtained with conventional operation.

Having thus described our invention, we claim:

1. A continuous process for treating pear waste which comprises continuously feeding a mixture of pear waste and lime into a treatment zone wherein it is subjected to repeated division and subdivision by cutting action, such treatment being continued until the mixture has passed through the gel stage and is reduced to an easily filterable composition of clear juice and small particles of gelled material containing enmeshed finely-divided material, heating this composition, then separating the juice from the solid components of the mixture.

2. A process for separating raw pear waste into its solid and juice fractions which comprises: mixing the pear waste with sufficient lime to establish a pH of about 6 to about 9; allowing the mixture to react at a temperature from about 60° F. to about 120° F., meanwhile subjecting it to repeated division and subdivision by cutting action, continuing the reaction and said cutting action as the mixture passes from a fluid stage to a gel stage to a synerized gel stage; heating the mixture to a temperature from about 150° F. to about 180° F. to further promote syneresis; then separating the juice from the solid components of the mixture.

3. A process for separating raw pear waste into its solid and juice fractions which comprises: mixing the pear waste with sufficient lime to establish a pH of about 8.5; allowing the mixture to react at a temperature from about 60° F. to about 120° F., meanwhile subjecting it to repeated division and subdivision by cutting action, continuing the reaction and said cutting action as the mixture passes from a fluid stage to a gel stage to a synerized gel stage; heating the mixture to a temperature from about 150° F. to about 180° F., then separating the juice from the solid components of the mixture.

ROBERT P. GRAHAM.
GEORGE H. NEEL.
NORMAN FISHMAN.

References Cited in the file of this patent
UNITED STATES PATENTS

| Number | Name | Date |
|---|---|---|
| 1,991,242 | Cole et al. | Feb. 12, 1935 |
| 2,536,240 | Vincent | Jan. 2, 1951 |
| 2,548,510 | Neal | Apr. 10, 1951 |